United States Patent Office 3,454,530
Patented July 8, 1969

3,454,530
NOVEL POLYOLS WHICH ARE REACTION PRODUCTS OF A MONOEPOXIDE AND A CYCLIC MONOANHYDRIDE
Leslie C. Case and Laura K. Case, both of 14 Lockeland Road, Winchester, Mass. 01890
No Drawing. Continuation-in-part of application Ser. No. 168,062, Jan. 23, 1962. This application Mar. 7, 1966, Ser. No. 532,116
Int. Cl. C08g 17/007, 17/08
U.S. Cl. 260—75    13 Claims

ABSTRACT OF THE DISCLOSURE

Novel polyols useful in the preparation of rigid polyurethane foams are described. These polyols are prepared by the reaction of a di- or tri-alkanolamine with a cyclic anhydride of an organic dicarboxylic acid and a lower alkylene oxide, at elevated temperature and pressure. The resultant polyols are trifunctional, with a central nitrogen core, connected by residues of epoxide and anhydride to hydroxyl-terminated polyester-ether chains. These polyols are further characterized by having a viscosity in the region of 1000 to 200,000 centipoises at 25° C.

This application is a continuation-in-part of our applications Ser. No. 168,062 filed Jan. 23, 1962, Ser. No. 188,842 filed Apr. 19, 1962, Ser. No. 456,816 filed May 18, 1965, and Ser. No. 485,932 filed Sept. 8, 1965, all now abandoned.

This invention relates to novel thermoplastic polyols and to the polyurethane formulations prepared therefrom. More particularly, this invention is concerned with novel thermoplastic polymers having terminal hydroxyl groups, with the methods of making these materials, and with the rigid polyurethane foams, polyurethane castings and polyurethane coatings prepared therefrom.

Polyurethane compositions are generally derived from the crosslinking reaction of a thermoplastic polymer having terminal hydroxyl groups, commonly referred to as a polyol, and an organic polyisocyanate, and many suitable polymers and formulations are known. Thermoplastic polymers suitable for polyurethane formulations belong to the broad class of polyether polyols and polyester polyols. In order to be useful in commercial polyurethane formulations such polyols must possess viscosities sufficiently low at room temperature to be readily and thoroughly miscible with the other components of the polyurethane formulation, such ready miscibility being essential for the production of strong, good quality foams with uniform pore structure. Relatively low room temperature viscosities are particularly desirable when foam machines or spray gun techniques are employed, in order to avoid the inconvenience of cumbersome and expensive preheating procedures, which additionally limit the use of the conventional low-boiling blowing agents. The viscosity restrictions imposed by conventional foaming techniques and standard foaming process equipment have thus far excluded the use of polyester polyols derived exclusively from inexpensive aromatic polycarboxylic acids, such as phthalic acid, which polyols are generally characterized by very high viscosities or are even glassy at room temperature.

It is an objective of the present invention to provide novel polyols containing aromatic dicarboxylic acid residues in substantial proportion by weight, yet possessing quite unexpectedly low viscosities of less than 200,000 centipoises at room temperature. It is a further objective of the present invention to furnish novel methods for the production of these polyols. It is yet another principal objective of the present invention to provide, at a savings in cost over presently known formulations, rigid polyurethane compositions possessing increased hydrolytic and thermal stability and low shrinkage and improved humid aging characteristics.

The present invention is based on the discovery that the novel polyols described herein-below quite unexpectedly and surprisingly possess bulk viscosities ranging from 1000 to about 200,000 centipoises, and frequently from about 5000 to 50,000 centipoises at 25° C., and that these polyols result in polyurethane foams with superior humid aging properties compared to those prepared from comparable polyether polyols.

The polyols provided by the present invention are essentially trifunctional, with each polymer molecule containing a nitrogen atom as a centrally located core having attached thereto three essentially linear hydroxyl-terminated polymer branch chains composed of lower terminal monoepoxide residues and cyclic monoanhydride residues. Suitable polyols can be represented by the general structural formula N (—POLYMER CHAIN—R—OH)$_3$, wherein N is a trivalent nitrogen radical, —POLYMER CHAIN— is a polymer chain attached thereto, R is a saturated lower aliphatic 1,2-alkylene radical having from two to six carbon atoms, and OH is a terminal hydroxyl group. The polymer chains, —POLYMER CHAIN— attached to the central nitrogen core are essentially composed of (X) saturated lower aliphatic 1,3-oxyalkylene radicals of the type —R—O— wherein R has the above-assigned meaning and the group —R—O— is derived from a terminal lower aliphatic monoepoxide by a ring-opening reaction, and (Y) anhydride residues of the general structural formula

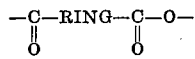

which are derived by a ring-opening reaction from a cyclic monoanhydride of the formula

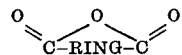

having from 8 to 14 carbon atoms, wherein RING represents a cyclic hydrocarbon radical selected from the group consisting of aromatic and cycloaliphatic ridicals having from six to 12 carbon atoms. The preferred polyols are those in which RING is an aromatic cyclic hydrocarbon radical. The mol ratio of the monoepoxide radicals to the anhydride residues, and thus the mol ratio of 1,3-oxyalkylene radicals to cyclic hydrocarbon radicals will vary from about 2.0 to about 10, and the arrangement of the X and Y members within the polymer chain is largely random, except that in order to be suitable for the preparation of the polyurethanes of the present invention it is an essential requirement that at least about 90 percent, and advisably at least 95 percent of the polymer molecules of these novel polyols have at least two of the 1,3-oxyalkylene groups attached directly through carbon to the central nitrogen atom, that is that they have the general core structure

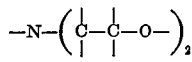

with the third valence of the central nitrogen being satisfied by a third 1,3-oxyalkylene group or by a cyclic anhydride residue of the structure described herein. The polyols may contain a small porportion of polymer molecules having the general core structure

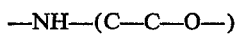

with the other nitrogen valence being satisfied by an anhydride residue, but the amount of such polymer molecules should advisably be less than about ten percent and preferably be less than five percent of the polyol composition.

Particularly preferred are polyols in which R is selected from the group consisting of 1,2-ethylene, 1,2-propylene, and 1,2-butylene, and RING is a cyclic hydrocarbon radical selected from the group consisting of 1,2-phenylene, 3,4,5,6-tetrachloro-1,2-phenylene, 3,4,5,6-tetrabromo-1,2-phenylene, 2,2'-biphenylene and 1,4,5,6,7,7-hexachlorobicyclo-(2,2,1)-2,3-heptenylene-5.

The novel polyols of the present invention are thermoplastic, soluble fluids ranging in number average molecular weight from at least 300 to generally not more than 750 and in hydroxyl equivalent weight, that is, in molecular weight per hydroxyl chain end, from about 100 to about 250. They are further characterized by having an acid number of from zero to five and usually less than 2 and by having an average of at least 2.9, and preferably about 3 hydroxyl groups per molecule. The acid number is the number of milligrams of potassium hydroxide necessary to neutralize the acidity of one gram of polyol. Suitable polyols of interest will have a nitrogen content ranging from at least 2.5 weight percent to about five percent of the total weight of the polyol. The weight content of the anhydride residues will range from at least 20 percent, and advisably at least 25 percent and frequently at least about 30 percent to generally not more than 70 percent, and advisably not more than 60 percent, and preferably not more than 50 percent by weight based on the total polyol weight, with the remainder being composed of 1,3-oxyalkylene monoepoxide residues. When the anhydride residues are derived from relatively low-molecular-weight dicarboxylic acids, such as phthalic acid, the weight percentage will tend to range from about 20 percent to about 50 percent whereas the amount of anhydride residues derived from the higher molecular weight halogenated dicarboxylic acids will vary from about 35 percent to about 70 percent by weight based on the total polyol weight. Despite the substantial proportion of cyclic hydrocarbon radicals incorporated into the polymer chains the bulk viscosity at room temperature of these polyols remains desirably low, ranging from at most about 200,000 centipoises and frequently from 100,000 centipoises to about 1000 centipoises at 25° C. By comparison, a trifunctional polyol prepared from glycerol, phthalic anhydride, and 2-ethyl-1,3-hexanediol, which contains a comparable weight percentage of cyclic 1,2-phenylene hydrocarbon radicals has a viscosity far in excess of 1,000,000 centipoises.

The novel polyols provided by the present invention may be prepared by reacting together in intimate admixture (1) an alkanolamine having three active hydrogen atoms and selected from the group consisting of tertiary and secondary alkanolamines and hydroxyalkylene ethers thereof, (2) a terminal lower aliphatic a monoepoxide, and (3) a cyclic monoanhydride of a dicarboxylic acid having both carboxylic acid groups attached to cyclic hydrocarbon radicals. The reaction is conducted within a temperature range of at least about 50° C. and generally not more than 200° C. and frequently within a range of about 100° C. to 150° C. Although the reaction may be carried out at atmospheric pressure, it is generally more convenient to conduct the polymerization in a closed system at superatmospheric pressure, such as autogenous pressure. Suitable superatmospheric pressures will generally range from about 50 pounds per square inch to about 500 pounds per square inch, and will frequently not exceed 200 pounds per square inch. The reaction can be effected batch-wise, in a closed vessel, such as an autoclave equipped with agitation, or under continuous conditions in a tubular reactor at elevated temperatures and pressures. The reaction is conveniently effected by combining all three reactants and heating them together at elevated temperature and pressure for a length of time sufficient to complete the reaction. The polymerization is generally completed within about one to five hours, with the exact time depending on the nature of the reactants and the reaction conditions employed.

To produce the novel polyether-polyesters of this invention the cyclic ether must be present in substantial concentration intimately admixed with each of the other reactants during the reaction time in which a major part of the ring-opening polymerization occurs. Otherwise stated, the process must be carried out in a manner such that a substantial amount of the cyclic ether is present in admixture with the anhydride and the polymerization starting compound while at least 50 percent and advisably while 75 percent of the ring-opening polymerization reaction is effected. Furthermore, an average of at least 0.3 equivalents of cyclic ether are advisably present in admixture with the sum of equivalents of acid groups plus one-half the equivalents of anhydride present while a major amount of the reaction occurs. A maximum of six equivalents of cyclic ether in this same ratio is generally used. A minimum of 1.0, and preferably 1.5 or 2.0 equivalents of cyclic ether in said ratio gives polymers of particularly desirable properties. For purposes of this invention one equivalent of cyclic ether is taken to be one mole of cyclic ether, and one equivalent of acid or anhydride is taken to be equal to that amount which is required to neutralize one mole of sodium hydroxide e.g. one equivalent of an acid group is equal to one carboxylic acid gram mole divided by the number of carboxylic acid groups per mole, and one mole of anhydride equals two equivalent, so that one-half the number of equivalents of anhydride present generally equals the number of moles present. While it is frequently convenient to combine all the reactants initially before heating the reaction mixture, it is to be understood that the entire amount of cyclic ether or all of the anhydride does not have to be present at the start of the reaction, but that these reactants may be suitably added in several substantial, sizable portions by means of a few large batchwise additions during the course of the polymerization reaction. In order to effect the homopolymerization of the cyclic ether to polyether segments it is absolutely essential however, that the cyclic ether is not added in a large number of very small increments which would result in a very low concentration of cyclic ether while the reaction proceeds. Thus, the cyclic ether cannot be added dropwise as the reaction proceeds because this mode of operation results in a minute instantaneous concentration of cyclic ether, and produces a pure polyester. Regardless of which mode of operation is adopted it is advisable to have the entire amount of alkanolamine present at the start of the reaction and in order to prepare the polyols most suitable for the preparation of the polyurethanes of this invention it is also advisable to have the total amount of cyclic monoanhydride present at the start of the reaction.

The polyols are believed to result from a random ring-opening addition reaction initiated by the active hydrogens of the alkanolamine which acts as the starter with the polymer chains growing by stepwise addition through ring-opening of the epoxide ring and the cyclic anhydride ring. Each active hydrogen of the alkanolamine is potentially capable of starting one such polymer chain.

The alkanolamines and hydroxyalkylene ether derivatives thereof suitable for use in this invention are those having the general structural formula

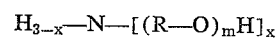

$$H_{3-x}-N-[(R-O)_mH]_x$$

wherein R is a lower aliphatic 1,2-alkylene radical having from two to six carbon atoms, $x$ is a positive integer having a value of two or three and $m$ is a positive integer having a value of one or two, and H is an active hydrogen capable of effecting the cleavage of epoxide and anhydride rings. Examples of useful tertiary alkanolamines ($x=3$) are triethanolamine, tripropanolamine and triisopropanolamine and the oxyethylene and oxypropylene derivatives thereof. Examples of useful secondary alkanolamines (x=2) are diethanolamine, dipropanolamine, and diisopropanolamine and the oxyalkylene derivatives thereof. Preferred alkanolamines and oxyalkylenealkanolamines are those having from four to about 18 carbon atoms. The alkanolamines and oxalkylenealkanolamines employed should advisably be dry, that is contain little or no water. Suitable alkanolamines will contain less than about one percent by weight, and preferably less than 0.5 percent by weight of water. In order to realize the benefits of the present invention it is further advisable that the di- and tri-alkanolamines or oxyalkylenealkanolamines employed contain less than about ten percent and preferably less than about five percent by weight of monoalkanolamines of the structure $H_2N-R-OH$ or ether derivatives thereof.

Mixtures of alkanolamines and oxyalkylenealkanolamines may be employed. In fact, one of the preferred operating embodiments of the present invention contemplates the preparation of the alkanolamine reactant in situ by the known reaction of anhydrous ammonia and saturated aliphatic monoepoxides, such as ethylene oxide or propylene oxide. This reaction generally results in a mixture of alkanolamines and some oxyalkylenealkanolamines and this mixture may be employed directly in further reaction with the other components of the process of this invention as described above. In preparing the alkanolamine reactant in this manner, process conditions known to the art are utilized, and the mol ratio of monoepoxide to anhydrous ammonia is chosen so that no ammonia is left over at the end of the reaction. The mol ratio of monoepoxide to ammonia employed should be at least about 2.5, and preferably at least three, in order to avoid the formation of any undesirably large amounts of monoalkanolamine derivatives. Reagents known to the art which alter the ratios of mono-, di-, and trialkanol derivatives formed, such as carbon dioxide, may advantageously be used in the preparation of the alkanolamine reactant.

Cyclic monoanhydrides suitable for preparing the polyols of this invention are those having from 8 to 14 carbon atoms and from zero to six halogen radicals selected from the group consisting of chloro and bromo radicals, and having the general structural formula

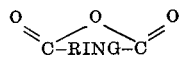

wherein RING is a cyclic hydrocarbon radical selected from the group consisting of aromatic and cycloaliphatic radicals having from six to 12 carbon atoms and from zero to six chloro or bromo atoms. Representative of the cyclic monoanhydrides which are useful in the present invention are phthalic anhydride, 3,4,5,6-tetrachlorophthalic anhydride, 3,4,5,6-tetrabromophthalic anhydride, and 1,4,5,6,7,7-hexachlorobicyclo-(2,2,1)-5-heptene-2,3-dicarboxylic acid anhydride (hereinafter referred to as Chlorendic anhydride) and 2,2'-diphenylene dicarboxylic acid anhydride (hereinafter referred to as diphenic acid anhydride). Particularly preferred for use in the present invention is phthalic anhydride. Mixtures of anhydrides may be used.

Useful terminal lower aliphatic monoepoxides are those having from 2 to 6 carbon atoms and having the general structural formula

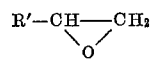

wherein R' is a radical selected from the group consisting of hydrogen, lower aliphatic alkyl radicals and lower aliphatic haloalkyl radicals. Mixtures of monoepoxides may be used. The preferred monoepoxides for use in the present invention are ethylene oxide and propylene oxide. Propylene oxide is particularly preferred. Examples of other useful epoxides are 1,2-butylene oxide and epichlorohydrin.

To prepare the polyols of the present invention the monoepoxide is employed in excess over the stoichiometric amount needed to react with the anhydride. To prepare suitable polyols a mol ratio of monoepoxide to cyclic monoanhydride of at least about 1.4 has to be employed. The mol ratio of monoepoxide residues, that is, 1,3-oxyalkylene radicals, to cyclic monoanhydride residues chemically combined will range from about 1.4 to about 2.5, and frequently will be about 1.5–2.0.

The amount of alkanolamine or hydroxyoxyalkylene alkanolamine will generally range from about 15 percent to about 70 percent by weight based on the weight of the total reactant mixture.

The polyols are viscous fluids readily soluble in many organic solvents. The equivalent weight of these polymers, that is the molecular weight per reactive hydroxyl group, is essentially equal to the equivalent weight of the starter, that is the molecular weight per reactive starter hydrogen, multiplied by the total weight of the combined reactants and divided by the weight of the starter employed.

The novel process of the present invention is particularly valuable for the preparation of polyols containing tetrachloro-1,2-phenylene radicals, tetrabromo-1,2-phenylene radicals, and hexachlorobicycloheptylene radicals. Known polyester polyols incorporating such radicals are extremely viscous and are very difficult to prepare by methods known to the art.

The novel polyurethanes of the present invention are prepared by reacting (1) an aromatic organic polyisocyanate having at least two isocyanate groups, that is two —NCO groups, with (2) the instant trifunctional polyols. All of the described polyols are useful in combination with polyisocyanates to prepare the polyurethanes of the present invention in the form of hard, tough coatings; rigid, tough castings; and, particularly, rigid, tough, non-elastic foams which have slow recovery properties. By employing such reactants as tetrachlorophthalic anhydride, tetrabromophthalic anhydride, or Chlorendic anhydride or epichlorohydrin, fire-resistant polyurethane compositions can be prepared without the use of special additives. The polyurethane compositions are prepared from polyols having equivalent weights ranging from about 100 to about 200, and occassionally to about 250. The equivalent weights of polyols based on phthalic anhydride will usually range from about 100 to somewhat more than 150, and polyols derived from halogenated anhydrides such as tetrachlorophthalic anhydride, will frequently have equivalent weights falling within the upper portion of the equivalent weight range. In comparison to prior art compositions, the instant polyurethanes are less expensive, possess better hydrolytic stability and better humid aging characteristics. To prepare useful polyurethanes the instant polyols may be used solely or they may be employed as blends, in admixture with other polyols, such as those described in our copending applications or commercially available polyols. When used in this manner, the instant polyols impart desirably low viscosity to the polyol blends.

The polyurethane compositions are prepared from the polyols described herein and organic polyisocyanates by mixing and reacting these materials in accordance with the standard techniques known to the art. For example, references which disclose the preparation of polyurethane foams, and the suitable materials for such preparation are U.S. Patents 2,779,689, 2,785,739, 2,787,601, 2,787,335, 3,079,350, and the bulletin, "Rigid Urethane Foams, II, Chemistry and Formulation," by C. M. Barringer, HR–26, Elastomer Chemicals Department, E. I. du Pont Co., April 1958, and the books by J. H. Saunders and K. C. Frisch, "Polyurethanes, Chemistry and Technology," Interscience, New York, N.Y., 1962 and 1964.

Polyurethane compositions are suitably prepared by mixing and reacting the trifunctionals polyols with a polyisocyanate having at least two isocyanato groups. In general, somewhat better physical properties result when isocyanates having a functionality of more than two are used. The polyisocyanates employed in the preparation of the polyurethane compositions can be such compounds as 2,4-tolylene diisocyanate, 2,6-tolylene diisocyanate, crude tolylene diisocyanates, 1,4-phenylene diisocyanate, 1,3-phenylene diisocyanate, 1,5-naphthalene diisocyanate, 4,4'-diphenylene diisocyanate, 3,3'-dimethyl-4,4'-diphenylene diisocyanate, 4,4'-diisocyanato diphenylmethane, and 4,4',4''-triisocyanato triphenylmethane. Other useful polyisocyanates are polymethylene polyphenylisocyanates produced by phosgenation of multifunctional condensation products of aniline and formaldehyde. One such product is PAPI which is a dark somewhat viscous liquid aromatic polyisocyanate containing both ortho and para substitution according to the formula:

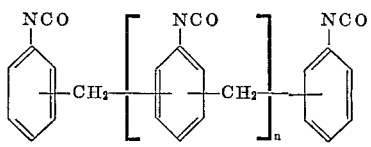

where $n$ has an average value of 1. The molecular weight is about 384 and the average number of isocyanato groups per molecule is 3.03. A similar product is known in the trade as Mondur MR. Polyisocyanates made by reacting trimethylolpropane or similar polyols with tolylene diisocyanates may also be used. Aromatic diisocyanates are especially useful. Mixtures of polyisocyanates may advantageously be used.

The polyurethanes are produce by the reaction of the instant polyol with the organic polyisocyanate under conditions generally used to form polyurethanes. Depending on the particular polyurethane formulation, the polyol-polyisocyanate reactant mixture will also desirably contain other conventional ingredients, such as one or more catalysts, surfactants, blowing agents, pigments, stabilizing agents or other additives. Such other components are employed in the standard amounts generally used in the preparation of polyurethanes, with the exception that less catalyst may be required for the polyurethanes of this invention since the polyols described herein tend to be more reactive than conventional polyethers.

Any of the conventional catalysts employed in polyurethane technology can be used as warranted. Some examples of useful catalysts which can be employed are tertiary amines, such as tetramethyl-1,3-butane diamine, triethylene diamine, triethanolamine, N-methylmorpholine, N-ethylmorpholine, tribenzylamine, N,N-dimethylbenzylamine, as well as tin compounds, such as dibutyl tin dilaurate, stannous oleate, stannous octoate, and others.

Conventional blowing agents, which vaporize at or below the temperature of the foaming mass, such as halohydrocarbons exemplified by fluorotrichloromethan (hereinafter referred to as Freon–11), stabilized fluorotrichloromethane (hereinafter referred to as Freon–11B) and dichlorodifluoromethane are used in preparing the rigid foams. Other known blowing agents, such as butane and methylene chloride, may also be employed.

Any of the various types of surfactants known to be useful in the preparation of cellular polyurethanes may be employed in the process of preparing polyurethane foams according to this invention. Examples of suitable surfactants are castor oil sulfonate, ethylene oxide adducts of sorbitol mono-esters of long-chain fatty acids, ethylene oxide adducts of alkyl phenols, polydimethylsiloxanes, and especially ethylene oxide adducts of polydimethylsiloxanes. These latter compounds, and similar block copolymers of polyglycols and dimethylsiloxane are especially useful for this purpose. U.S. Patent 2,834,748 describes such especially suitable water-soluble organo-silicone copolymers for use as emulsifying agents. Examples of useful commercially available organo-silicones are DC–113, X–520, and Silicone Fluid 199.

In the preparation of rigid polyurethane foams it is possible to use the so-called "one-shot" method in which all ingredients of the formulation are combined in one step, or one may employ the prepolymer technique wherein the polyisocyanate is partially prereacted with the polyol. In addition to obviously being usuable in prepolymer and semi-prepolymer-type systems, the instant polyols are particularly well suited for one-shot foaming because of their specific combination of relatively high equivalent weight, low viscosity, and good reactivity.

Because of the special qualities inherent in the novel polyols of this invention polyurethane formulations are obtained which are nonresilient and tough and which give rigid foams, hard coatings and rigid solid castings. In general, satisfactory amounts of polyisocyanate will range from about 60 percent, and preferably not more than about 50 percent to not less than about 25 percent by weight of the combined weight of the polyol-polyisocyanate reactants.

In general, the polyurethane foams produced with the novel polyols and a polyisocyanate have a modulus in excess of 5 p.s.i. for a 20% deflection in compression, and a yield point of more than 10 p.s.i. in compression, when made into a foam having a bulk density of 2.0 pounds per cubic foot.

The dimensional stability of humid aging at 158° F. (70° C.) and 100% relative humidity of the polyurethanes of the present invention compare very favorably with those of the rigid polyurethane foams in present commercial use. Many of the foams of the present invention have volume increases of less than 20 percent and frequently less than 15 percent when a 2.0 pound-per-cubic-foot foam is aged for twenty days at 70° C. and 95% relative humidity. Similarly low volume changes are found at foam densities of about 1.7 pounds per cubic foot or even less. It is particularly unexpected that polyurethane foams prepared from polyols having equivalent weights ranging as high as about 225 show volume changes of less than 15% on aging for 25 days or longer at 70° C. and 100% relative humidity.

The use of the instant polyols is also very useful in the preparation of polyurethane castings. In the preparation of polyurethane castings it is necessary that the polyols have an extra low acid number such as 2 or less (5 is considered a maximum high) and a water content of 0.02% or less. To prepare such polyols having the required low acid number and water content by conventional techniques is particularly troublesome, difficult, and expensive. However, polyols having the necessary extra low acid number and water content can be formed directly by the novel process described herein, since water is not formed in this process. The present polyols allow the preparation of such castings in a novel one-step process, in contrast to the conventional multi-step method in use at present. In addition, polyurethane castings based on these novel polyols can be prepared with a lower polyisocyanate content and do not require any curing agent.

In the formation of polyurethane castings the polyol and polyisocyanate are combined and, without a catalyst, can be cured at about 70 to 150° C. to a solid product. The increased reactivity of the instant polyols which appears to stem from their tertiary nitrogen content is particularly advantageous in this application. When a catalyst such as a tertiary amine or a tin compound is used, curing can be achieved at room temperature.

The polyurethane compositions of the instant invention also serve well as tough, hard adherent coatings in a number of applications. Preferred in this application are polyols derived from dialkanol amines. Specifically, these polyurethanes form excellent protective coatings for wood surfaces subjected to abrasion and impact, such as floors, furniture, and bowling alleys. They also form excellent protective coatings for metal substrates subjected to bending, abrasion, or chemical attack. The polyurethane coating compositions can be applied to such surfaces by any of the conventional fluid coating techniques such as, for example, spray, dip, brush, knife and roller coating. The compositions may be diluted with solvents such as lactones, ketones, esters, ethers, and others, and pigments and other additives may be added, if desired. In general, the solvent-diluted compositions are coated onto the substrate, then dried and cured at room temperature or elevated temperature. The cured coating compositions are hard, flexible, abrasion-resistant and chemically inert and exhibit excellent adhesion.

While the chief use of the novel polyols of the present invention is envisioned to be in the preparation of polyurethanes, the polyols may also be employed as intermediates in the preparation of other resins, such as air-drying alkyd resins, or they may be used as such in such applications as hydraulic fluids.

The following examples are presented to illustrate, but not to limit, the invention:

EXAMPLE I 103.8 g. of triethanolamine, 123.3 g. of phthalic anhydride, and 145.4 g. of propylene oxide are combined in a 1-liter 316 stainless steel reactor, and the reactor is closed and sealed. The reactant mixture is heated, with stirring, to 275° F. and held at this temperature for 1 hour and 10 minutes. The maximum pressure reached is 102 p.s.i.g. The vessel is then vented and the product recovered.

The recovered product weighs 306 g., is orange colored, has a somewhat unpleasant odor, and has a viscosity of about 5,000 centipoises at 25° C. The amount of combined propylene oxide is 79 grams, and the calculated equivalent weight is 149.

This example is repeated substituting 150 g. of 1,2-butylene oxide for the propylene oxide. The results are very similar, except that the recovered product weighs about 325 grams.

EXAMPLE II 116.3 g. of technical-grade triisopropanolamine, 100.0 g. of phthalic anhydride, and 99.7 g. of propylene oxide are added to a 1-liter, 316 stainless steel pressure vessel, and the vessel is closed and sealed. The reactant mixture is heated with stirring to 260° F. and held at that temperature for 1 hour and 15 minutes. The maximum pressure reached is 66 p.s.i.g. The vessel is then vented and the product is isolated.

The product is red-brown in color, has a mild odor, and weighs 272 g., indicating that 56 grams of propylene oxide have become combined. The viscosity is about 15,000–20,000 centipoises at 25° C. and the calculated equivalent weight is 149.

101.5 g. of the above polyol is mixed with 25.5 g. of chlorotrifluoromethane, 2.9 g. of a copolymer of silicone and polyethylene glycol (L–520) and 98.7 g. of polyphenylenepolyisocyanate. The mixture has not creamed in 4 minutes. Then 0.9 g. of tetramethyl-1,3-butane diamine, is stirred in, and the mixture foams very quickly to a fine-celled foam having a density of about 2 pounds per cubic foot. A slight amount of shrinkage is observed on cooling.

The above preparation of the polyol is repeated substituting 200 g. of tetrachlorophthalic anhydride for the phthalic anhydride, and using 150 g. of propylene oxide. The results are similar, except that the product is considerably more viscous and weighs about 375 g.

Another polyol is prepared as described above using 275 g. of chlorendic anhydride as the anhydride, and 150 g. of propylene oxide. This product is quite viscous and weighs about 450 g.

EXAMPLE III

A mixture of 98.5 g. of diisopropanolamine, 113.0 g. of phthalic anhydride, and 160.5 g. of propylene oxide is combined in a 1-liter, 316 stainless steel pressure vessel and the vessel is closed and sealed. The mixture is heated to 270° F., with stirring, and held at this temperature for 1 hour and 30 minutes. The maximum pressure attained is 87 p.s.i.g. The pressure vessel is then vented and the product recovered.

The product is yellow in color, and has a mild odor. The product weighs 286 g., indicating that 74 g. of propylene oxide has become combined. The viscosity is about 60,000 centipoises at 25° C., and the calculated equivalent weight is 128.

To 101.6 g. of this polyol in a 1-gallon bucket is added 32.0 g. of chlorotrifluoromethane, 2.8 g. of a silicone-glycol copolymer surfactant, 3.0 g. of tetramethyl-1,3-butanediamine, and 119.1 g. of polyphenylenepolyisocyanate. The mixture foams quickly to a rigid polyurethane foam having a density of about 2 pounds per cubic foot, which foam does not shrink on cooling. On exposure to 95% relative humidity and 70° C. for 28 days, the foam shows a volume increase of about 15%.

EXAMPLE IV

This example illustrates the use of monoisopropanolamine as a starter.

102.7 g. of monoisopropanolamine, 200.4 g. of phthalic anhydride, and 245.7 g. of propylene oxide are added to a 1-liter 316 stainless steel pressure vessel, and the vessel is closed and sealed. The mixture is then heated to 275° F., with stirring, and held at this temperature for 1 hour and 40 minutes. The maximum pressure is 86 p.s.i.g. The vessel is then vented and the product recovered.

The product is very pale in color, weighs 426 g., and has a viscosity of less than 1000 centipoises at 25° C., and crystallizes on standing at 55° F.

EXAMPLE V

This example illustrates the preparation of a mixed diisopropanolamine-triisopropanolamine starter in situ, using ammonia and propylene oxide.

Ammonia, 35 g., and propylene oxide, 500 g., are slowly pumped under pressure into a 1-liter 316 stainless steel pressure vessel equipped with cooling coils. The temperature is raised to 150° C., the initial exotherm being controlled with the use of the cooling coils. Then the temperature is maintained at 150° C. for a length of time sufficient for the pressure to drop substantially, and become nearly constant.

The product is viscous, and weighs 320 g. It has a calculated equivalent weight of 52. 104 g. of the above product, 151.2 g. of phthalic anhydride, and 123.6 g. of propylene oxide are placed in a 1-liter 316 stainless steel pressure vessel. The vessel is then closed and sealed. The mixture is then heated to 270° F., with stirring and held at this temperature for 1 hour and 45 minutes. The vessel is then vented. The product weighs about 355 g., has a viscosity of about 40,000 centipoises at 25° C., and a calculated equivalent weight of 172.

We claim:

1. A fluid polymer having the general formula

wherein N is a nitrogen radical, R is a saturated lower aliphatic 1,2-alkylene radical having from two to six carbon atoms, OH is a hydroxyl radical and POLYMER CHAIN is a polymer chain composed of an essentially random arrangement of (X) saturated lower aliphatic radicals of the structural formula —R—O—, and (Y) cyclic monoanhydride residues of the general formula

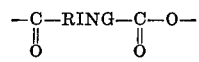

wherein —RING— is a cyclic hydrocarbon radical having from six to twelve carbon atoms and from zero to six halogen substituents selected from the group consisting of chloro and bromo radicals, with the mol ratio of said (X)

units to said (Y) units varying from 2.0 to about 10 and with at least two of said polymer chains being attached to said nitrogen radical through the carbon atoms of said —R—O— radicals, said polymer having a molecular weight of at least 300, and an acid number of from zero to five and a bulk viscosity of not more than about 200,000 centipoises at 25° C.

2. The polymer of claim 1 wherein said R is selected from the group consisting of 1,2-ethylene, 1,2-propylene, and 1,2-butylene, and RING is 1,2-phenylene.

3. The polymer of claim 1 wherein R is selected from the group consisting of 1,2-ethylene, 1,2-propylene and 1,2-butylene, and RING is 3,4,5,6-tetrachloro-1,2-phenylene.

4. The polymer of claim 1 wherein R is selected from the group consisting of 1,2-ethylene, 1,2-propylene, and 1,2-butylene, and RING is 1,4,5,6,7,7-hexachloro-bicyclo-(2,2,1)-2,3-heptenylene-5.

5. The polymer of claim 2 wherein said R is 1,2-propylene.

6. The polymer of claim 1 wherein R is selected from the group consisting of 1,2-ethylene, 1,2-propylene, and 1,2-butylene, and RING is 3,4,5,6-tetrabromo-1,2-phenylene.

7. The polymer of claim 1 in which at least one of said polymer chains is attached to said nitrogen radical through said cyclic monoanhydride residue

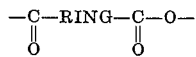

8. The process of preparing a hydroxyl-terminated fluid polymer having a molecular weight of at least 300, an acid number of from zero to five, and a bulk viscosity of not more than about 200,000 centipoises at 25° C. which consists essentially of heating together in intimate admixture at a temperature of about 50° C. to 200° C. (1) a saturated lower aliphatic terminal monoepoxide (2) a cyclic monoanhydride of the structure

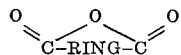

wherein RING is a cyclic hydrocarbon radical having from six to twelve carbon atoms and from zero to six halogen substituents selected from the group consisting of chloro and bromo radicals, and (3) from about 15 to 60 percent by weight based on the weight of the reactant mixture of an alkanolamine starter having three reactive hydrogen atoms and consisting of at least 90 percent by weight of an alkanolamine selected from the group consisting of tertiary and secondary alkanolamines and hydroxy-alkylene-ethers thereof, allowing the reaction to proceed with the epoxide being present in substantial concentration in the admixture during the time in which at least 50 percent of the ring-opening polymerization is effected, and recovering the resinous product, with the proportion of reactants employed being such that in the fluid polymer the molar ratio of the sum of the saturated lower aliphatic 1,2-alkylene radicals derived from said monoepoxide and said alkanolamine starter to residues derived from said cyclic monoanhydride is more than 2.0.

9. The process of claim 8 wherein said saturated lower terminal monoepoxide is selected from the group consisting of ethylene oxide, propylene oxide, and 1,2-butylene oxide and said cyclic monoanhydride is phthalic anhydride.

10. The process of claim 8 wherein said saturated lower terminal monoepoxide is selected from the group consisting of ethylene oxide, propylene oxide, and 1,2-butylene oxide and said cyclic monoanhydride is 3,4,5,6-tetrachlorophthalic anhydride.

11. The process of claim 8 wherein said saturated lower terminal monoepoxide is selected from the group consisting of ethylene oxide, propylene oxide, and 1,2-butylene oxide and said cyclic monoanhydride is 1,4,5,6,7,7-hexachlorobicyclo - (2,2,1) - 5 - heptene - 2,3 - dicarboxylic acid anhydride.

12. The process of claim 8 wherein said saturated lower terminal monoepoxide is selected from the group consisting of ethylene oxide, propylene oxide, and 1,2-butylene oxide and said cyclic monoanhydride is 3,4,5,6-tetrabromophthalic anhydride.

13. The process of claim 8 wherein said alkanolamine starter is a secondary alkanolamine.

References Cited
UNITED STATES PATENTS

| | | |
|---|---|---|
| 3,089,863 | 5/1963 | Hicks et al. |
| 3,254,060 | 5/1966 | Connolly et al. _____ 260—75 |
| 3,275,678 | 9/1962 | Bernstein et al. _____ 260—75 |

WILLIAM H. SHORT, *Primary Examiner.*

F. D. ANDERSON, *Assistant Examiner.*

U.S. Cl. X.R.

117—161; 252—77; 260—2.5, 22, 30.4, 31.2, 32.8, 33.4, 78.4